United States Patent
Wang et al.

(10) Patent No.: US 11,567,671 B2
(45) Date of Patent: Jan. 31, 2023

(54) METHOD, ELECTRONIC DEVICE, AND COMPUTER PROGRAM PRODUCT FOR STORAGE MANAGEMENT

(71) Applicant: EMC IP Holding Company LLC, Hopkinton, MA (US)

(72) Inventors: Yi Wang, Chengdu (CN); Jun Tang, Chengdu (CN); Qingxiao Zheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/327,356

(22) Filed: May 21, 2021

(65) Prior Publication Data
US 2022/0342564 A1 Oct. 27, 2022

(30) Foreign Application Priority Data
Apr. 21, 2021 (CN) .......................... 202110433325.9

(51) Int. Cl.
*G06F 3/06* (2006.01)
*G06F 11/07* (2006.01)

(52) U.S. Cl.
CPC ............ *G06F 3/0619* (2013.01); *G06F 3/064* (2013.01); *G06F 3/0631* (2013.01); *G06F 3/0644* (2013.01); *G06F 3/0653* (2013.01); *G06F 3/0673* (2013.01); *G06F 11/076* (2013.01); *G06F 11/0772* (2013.01)

(58) Field of Classification Search
CPC ...... G06F 3/0619; G06F 3/0631; G06F 3/064; G06F 3/0644; G06F 3/0653; G06F 3/0673; G06F 11/076; G06F 11/0772
USPC ........................................................ 714/763
See application file for complete search history.

(56) References Cited

U.S. PATENT DOCUMENTS

| | | | | |
|---|---|---|---|---|
| 8,453,036 | B1 * | 5/2013 | Goel | H03M 13/3761 714/763 |
| 9,503,517 | B1 * | 11/2016 | Brooker | G06F 3/0631 |
| 9,940,073 | B1 * | 4/2018 | Thangapalam | G06F 3/0685 |
| 10,108,644 | B1 * | 10/2018 | Wigmore | G06F 16/214 |
| 2005/0228944 | A1 * | 10/2005 | Homma | G06F 11/1448 711/170 |

(Continued)

*Primary Examiner* — Albert Decady
*Assistant Examiner* — Enam Ahmed
(74) *Attorney, Agent, or Firm* — Womble Bond Dickinson (US) LLP (57) ABSTRACT

Embodiments of the present disclosure relate to a method, an electronic device, and a computer program product for storage management. The method for storage management includes determining the data volume of corresponding failed data in a plurality of candidate sub-storage spaces of a disk, the plurality of candidate sub-storage spaces being formed by dividing the original storage space of the disk and having consecutive physical addresses, and the size of one candidate sub-storage space being associated with the size of the storage space of at least one block that constitutes the disk; and selecting a target sub-storage space to be released from the plurality of candidate sub-storage spaces based at least on the data volume of the corresponding failed data. As such, since the operation of moving valid data in an SSD block to a new SSD block is reduced, the WAF of a storage system, especially an SSD, can be effectively reduced, and the service life of the SSD can be prolonged.

20 Claims, 5 Drawing Sheets

(56) References Cited

U.S. PATENT DOCUMENTS

| | | | |
|---|---|---|---|
| 2006/0136684 A1* | 6/2006 | Le | G06F 3/0614 |
| | | | 713/320 |
| 2009/0327602 A1* | 12/2009 | Moore | G06F 3/0634 |
| | | | 711/170 |
| 2010/0251012 A1* | 9/2010 | Zwisler | G06F 11/1092 |
| | | | 714/E11.085 |
| 2011/0106862 A1* | 5/2011 | Mamidi | G06F 16/185 |
| | | | 707/823 |

* cited by examiner

METHOD, ELECTRONIC DEVICE, AND COMPUTER PROGRAM PRODUCT FOR STORAGE MANAGEMENT

CROSS-REFERENCE TO RELATED APPLICATION

This patent application claims priority, under 35 U.S.C. § 119, of Chinese Patent Application No. 202110433325.9, filed Apr. 21, 2021, which is incorporated by reference in its entirety.

TECHNICAL FIELD

Embodiments of the present disclosure generally relate to data processing systems, and more particularly, to a method, an electronic device, and a computer program product for storage management.

BACKGROUND

A crucial aspect in an all-flash system is to reduce the write amplification factor (WAF) of the solid state drive (SSD). A greater WAF will slow down the input and output (I/O) of the SSD and affect the service life of the SSD.

Especially in a deduplication system, it is more important to reduce the WAF of the entire all-flash deduplication system due to complicated chunk data reference relationships. The reason is that when an expired backup is to be deleted, the complicated reference relationships make it possible to delete only part of the chunk data in one SSD block, and those chunk data still referenced by other valid backups will be retained.

Therefore, in an all-flash deduplication system, invalid bug pages are more likely to be caused in an SSD block, and these invalid bugs will increase the WAF of the SSD.

SUMMARY OF THE INVENTION

Embodiments of the present disclosure relate to an improved solution for storage management.

In a first aspect of the present disclosure, a method for data processing is provided. The method includes determining the data volume of corresponding failed data in a plurality of candidate sub-storage spaces of a disk, the plurality of candidate sub-storage spaces being formed by dividing the original storage space of the disk and having consecutive physical addresses, and the size of one candidate sub-storage space being associated with the size of the storage space of at least one block that constitutes the disk; and selecting a target sub-storage space to be released from the plurality of candidate sub-storage spaces based at least on the data volume of the corresponding failed data.

In a second aspect of the present disclosure, an electronic device is provided. The electronic device includes: at least one processor; and at least one memory storing computer program instructions, the at least one memory and the computer program instructions being configured to cause, together with the at least one processor, the electronic device to perform actions. The actions include determining the data volume of corresponding failed data in a plurality of candidate sub-storage spaces of a disk, the plurality of candidate sub-storage spaces being formed by dividing the original storage space of the disk and having consecutive physical addresses, and the size of one candidate sub-storage space being associated with the size of the storage space of at least one block that constitutes the disk; and selecting a target sub-storage space to be released from the plurality of candidate sub-storage spaces based at least on the data volume of the corresponding failed data.

In a third aspect of the present disclosure, a computer program product is provided. The computer program product is tangibly stored on a non-volatile computer-readable medium and includes computer-executable instructions. When executed, the machine-executable instructions cause a device to perform the method in the first aspect.

It should be understood that the content described in the Summary of the Invention part is neither intended to limit key or essential features of the embodiments of the present disclosure, nor intended to limit the scope of the present disclosure. Other features of the present disclosure will become readily understood in conjunction with the following description.

BRIEF DESCRIPTION OF THE DRAWINGS

The above and other objectives, features, and advantages of the embodiments of the present disclosure will become easily understandable by reading the following detailed description with reference to the accompanying drawings. In the accompanying drawings, several embodiments of the present disclosure are shown by way of example instead of limitation, where.

Throughout the accompanying drawings, the same or similar reference numerals are used to indicate the same or similar components.

DETAILED DESCRIPTION

The principles and spirits of the present disclosure will be described below with reference to several example embodiments shown in the accompanying drawings. It should be understood that these specific embodiments are described only for the purpose of enabling a person skilled in the art to better understand and then implement the present disclosure, rather than limiting the scope of the present disclosure in any way.

Figure 1:
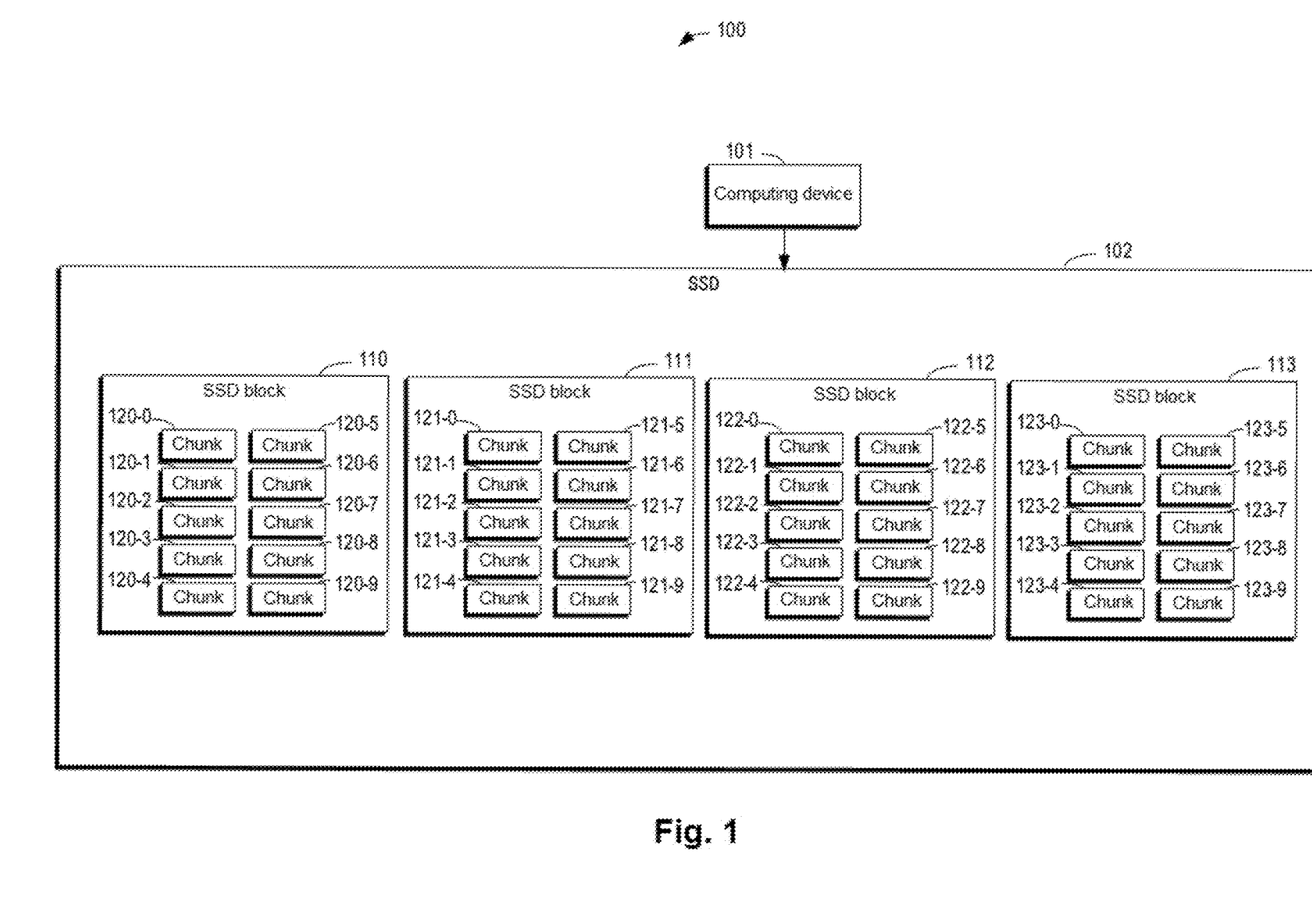
FIG. 1 illustrates a block diagram of an example storage system in which embodiments of the present disclosure can be implemented.

FIG. 1 illustrates a schematic diagram of example storage system 100 in which embodiments of the present disclosure can be implemented. As shown in FIG. 1, storage system 100 may include solid state drive (SSD) 102. SSD 102 may be composed of a plurality of SSD blocks, such as SSD blocks 110, 111, 112, and 113.

Each SSD block may include a plurality of chunks. For example, SSD block 110 includes chunks 120-0 to 120-9. SSD block 111 includes chunks 121-0 to 121-9. SSD block 112 includes chunks 122-0 to 122-9. SSD block 113 includes chunks 123-0 to 123-9.

Storage system 100 may further include computing device 101. Computing device 101 may be used to manage the operations of SSD 102, such as reading, writing, deleting, and storage space release.

It should be understood that FIG. 1 only exemplarily illustrates the structure of SSD 102. However, SSD 102 may include any number of SSD blocks, and is not limited to the example shown in FIG. 1.

As mentioned above, in an all-flash system, one of the most important aspects is to reduce the write amplification factor (WAF) of the SSD. A greater WAF will slow down the input and output (I/O) of the SSD and affect the service life of the SSD.

Storage system 100 shown in FIG. 1 may be, for example, a deduplication system. In this deduplication system, the chunks included in each SSD block have complicated reference relationships. Therefore, it is particularly important to reduce the WAF of the entire system.

When an expired backup is to be deleted, the complicated reference relationships of the chunks make it possible to delete only part of the chunk data in one SSD block, and chunk data still referenced by other valid backups will be retained.

In this case, invalid bug pages are often caused in the SSD block, and these invalid bugs will increase the WAF of the SSD.

For a backup system, it is always necessary to delete old expired backup data and release storage spaces to store new backup data. Deleted data storage spaces are released in the garbage recycling process.

In a traditional garbage collection solution, storage spaces will be released as much as possible in the garbage collection process. At the same time, traditional garbage collection solutions usually randomly select storage spaces for release. However, traditional garbage recycling solutions work well for a traditional hard disk drive (HDD) backup system, but they do not work well for an SSD backup system.

In a backup system, data can be referenced by a plurality of backups for deduplication. Therefore, after some backups are deleted, some chunk data may still be valid because they are still referenced by other valid backups. These deleted backups will cause invalid holes to be created in the SSD block.

These invalid holes will increase the WAF because the SSD will move valid chunk data to a new SSD block and erase the old SSD block.

The valid chunk data in the new SSD block may become invalid in the next garbage recycling process. The still valid chunk data will be moved to another new SSD block again, and the old SSD block will be erased again.

Figure 2:
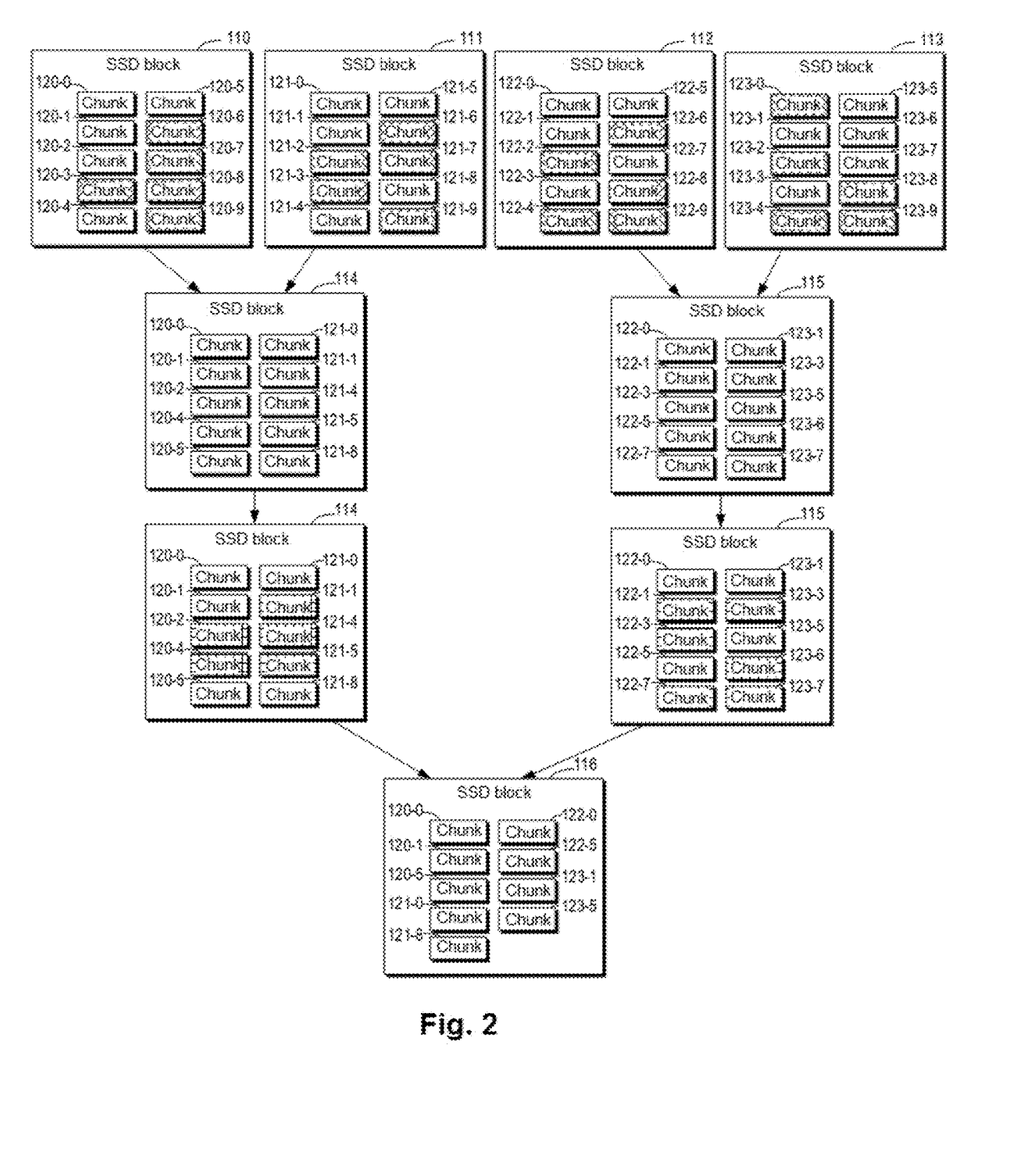
FIG. 2 illustrates a schematic diagram of a garbage recycling process according to the embodiments of the present disclosure.

FIG. 2 illustrates a schematic diagram of a garbage recycling process according to the embodiments of the present disclosure. As shown in FIG. 2, SSD block 110 includes chunks 120-0 to 120-9. SSD block 111 includes chunks 121-0 to 121-9. SSD block 112 includes chunks 122-0 to 122-9. SSD block 113 includes chunks 123-0 to 123-9.

As the system is used, data of the chunks in some SSD blocks becomes invalid. For example, the data of chunks 120-3 and 120-6 to 120-9 in SSD block 110 becomes invalid. For another example, the data of chunks 121-2, 121-3, 121-6, 121-7, and 120-9 in SSD block 111 becomes invalid.

In a garbage recycling process, the still valid chunks in each of SSD blocks 110, 111, 112, and 113 are removed to a new SSD block. For example, chunks 120-0 to 120-2, 120-4, and 120-5 in SSD block 110 are moved to SSD block 114. Chunks 122-0, 122-1, 122-3, 122-5, and 122-7 in SSD block 112 are moved to SSD block 115.

The valid chunks moved to new SSD blocks 114 and 115 during this garbage recycling process may go on to become invalid chunks. For example, the data of chunks 120-2, 120-4, 121-1, 121-4, and 121-5 in SSD block 114 will become invalid chunks.

In the next garbage recycling process, the still valid chunks moved to new SSD blocks 114 and 115 will be moved to a new SSD block again. For example, as shown in FIG. 2, valid chunks 120-0, 120-1, 120-5, 121-0, and 121-8 in SSD block 114 are moved to new SSD block 116.

It can be seen that, in the example of the garbage recycling process shown in FIG. 2, all invalid storage spaces are released as much as possible during each round of garbage recycling, which is not conducive to saving system overhead.

In order to solve this problem, it is desirable to delay the release process for part of the storage spaces. The corresponding storage spaces can be released after more chunks become invalid. In this way, writing of some chunk data can be avoided, which will be later deleted from the SSD blocks.

Figure 3:
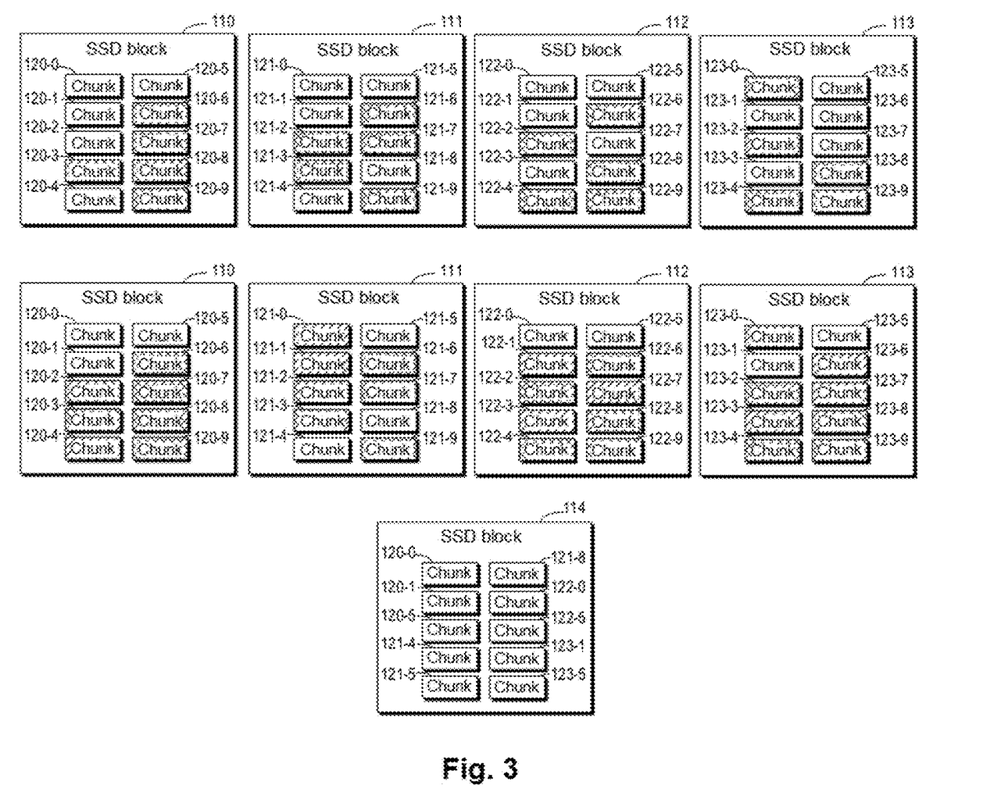
FIG. 3 illustrates a schematic diagram of a garbage recycling process according to the embodiments of the present disclosure.

FIG. 3 illustrates a schematic diagram of a garbage recycling process according to the embodiments of the present disclosure. As shown in FIG. 3, when the chunk data in some of the SSD blocks become invalid. For example, the data of chunks 120-3 and 120-6 to 120-9 in SSD block 110 becomes invalid. For another example, the data of chunks 121-2, 121-3, 121-6, 121-7, and 120-9 in SSD block 111 becomes invalid.

However, the storage spaces corresponding to the failed chunk data are not in a hurry to be released. It is possible to wait until the data of more chunks in the SSD blocks becomes invalid. For example, as the system is used, the data of chunk 120-4 in SSD block 110 goes on to become invalid, and the data of chunks 121-0 and 121-1 in SSD block 111 goes on to become invalid.

Next, in a garbage recycling process, the still valid chunks in each of SSD blocks 110, 111, 112, and 113 are removed to a new SSD block. For example, chunks 120-0 to 120-1 and 120-5 in SSD block 110, chunks 121-4 to 121-5 and 121-8 in SSD block 111, chunks 122-0 and 125-5 in SSD block 112, and chunks 123-1 and 123-5 in SSD block 113 are moved to SSD block 114.

In order to further optimize the storage space release process, the embodiments of the present disclosure provide a method for storage management. In the solution of the present disclosure, the data volume of corresponding failed data in a plurality of sub-storage spaces of a disk may be determined separately, and a sub-storage space to be released may be selected based at least on the data volume of the respective failed data of these sub-storage spaces. In this way, the WAF of the storage system, especially an SSD, can be effectively reduced, and meanwhile the service life of the SSD can be prolonged.

Figure 4:
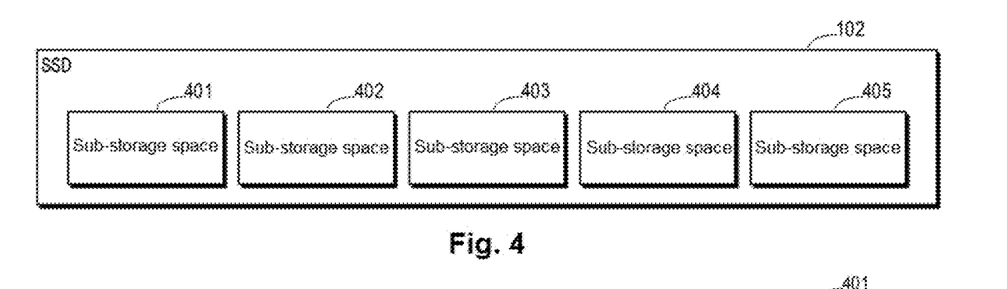
FIG. 4 illustrates a schematic diagram of a plurality of sub-storage spaces according to the embodiments of the present disclosure.

FIG. 4 illustrates a schematic diagram of a plurality of sub-storage spaces according to the embodiments of the present disclosure. As shown in FIG. 4, the storage space of SSD 102 may be divided into a plurality of sub-storage spaces 401 to 405. Each of these sub-storage spaces may have consecutive physical addresses. The size of one sub-storage space may be associated with the size of a storage space of one SSD block of a plurality of SSD blocks that constitute SSD 102. For example, the size of the sub-storage space may be N×M if the size of the storage space of the SSD block is M.

In some embodiments, the storage system may periodically obtain the size of the remaining free storage space of the SSD disk. The determination of the data volume of the corresponding failed data for each sub-storage space of the SSD disk may be triggered if the storage system determines that the size of the remaining free storage space of the SSD disk is less than a threshold space size.

In some embodiments, the determination of the data volume of the corresponding failed data of each sub-storage space of the SSD disk may also be triggered by a new read-write request. For example, the storage system can determine whether the size of the remaining free storage space of the current SSD disk can meet the data volume of the target data if the storage system receives a write request for target data. The determination of the data volume of the corresponding failed data of each sub-storage space of the SSD disk can be triggered if it is determined that the size of the remaining free storage space of the current SSD disk is less than the data volume of the target data.

By means of determining the data volume of the corresponding failed data of each sub-storage space of the SSD disk, a target storage space to be released can be selected from these sub-storage spaces.

Figure 5:
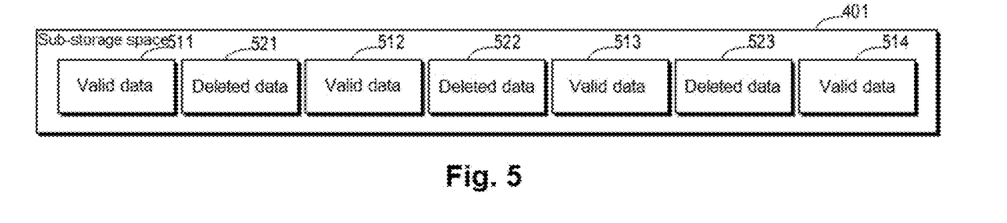
FIG. 5 illustrates a schematic diagram of selecting a sub-storage space to be released according to the embodiments of the present disclosure.

FIG. 5 illustrates a schematic diagram of selecting a sub-storage space to be released according to the embodiments of the present disclosure. A selection process of the sub-storage space to be released will be described in conjunction with FIG. 4 and FIG. 5.

As shown in FIG. 5, sub-storage space 401 may include a plurality of valid data 511 to 513, and a plurality of deleted data 521 to 523 that can be regarded as failed data. Similarly, other sub-storage spaces 402 to 405 in FIG. 4 may also include their respective valid data and deleted data.

In some embodiments, the data volumes of the deleted data in all the sub-storage spaces may be determined. For example, in sub-storage space 401 shown in FIG. 5, assuming that the data volume of deleted data 521 is S1, the data volume of deleted data 522 is S2, and the data volume of deleted data 523 is S3, the total volume of the deleted data in sub-storage space 401 is St=S1+S2+S3. Assuming that the total size of sub-storage space 401 is S, it can be determined that a ratio (Rd) of the data volume of failed data in sub-storage space 401 to the total size is St/S. In this way, the corresponding Rd value in each of sub-storage spaces 401 to 405 can be determined.

In the process of selecting the sub-storage space to be released, sub-storage spaces having Rd values exceeding a threshold Rd among various sub-storage space 401 to 405 can be determined. For example, sub-storage space 401 is determined as the target sub-storage space to be released if it is determined that the Rd value of sub-storage space 401 exceeds the threshold Rd.

In some embodiments, the target sub-storage space to be released may be further selected if it is determined that the Rd values of two or more sub-storage spaces exceed the threshold Rd.

For example, a first sub-data volume in the data volume of the failed data of sub-storage space 401 and a second sub-data volume in the data volume of the failed data of sub-storage space 402 may be determined if the Rd values of sub-storage space 401 and sub-storage space 402 both exceed the Rd value. The first sub-data volume may correspond to a group of storage spaces with consecutive physical addresses in sub-storage space 401, and the second data volume may correspond to a group of storage spaces with consecutive physical addresses in sub-storage space 402.

In some embodiments, a group of data volumes is determined as the first data volume if it is determined that the group of storage spaces corresponding to a group of data volumes in the data volume of the failed data of sub-storage space 401 have consecutive physical addresses and the total consecutive amount exceeds a threshold data volume.

Likewise, a group of data volumes is determined as the second data volume if it is determined that the group of storage spaces corresponding to a group of data volumes in the data volume of the failed data of sub-storage space 402 have consecutive physical addresses and the total consecutive amount exceeds a threshold data volume.

In one embodiment, the threshold data volume may be defined according to the size of the storage space of one SSD block. For example, the threshold data volume may be determined to be three times the size of the storage space of one SSD block. Therefore, the threshold data volume may ensure that the failed data will cover one or more SSD blocks. If these failed data are deleted, no data will be rewritten to other SSD blocks, because there is no valid data needing to be moved to other SSD blocks. Furthermore, the whole SSD block may be directly erased as all the data in the SSD block are failed data.

Still referring to FIG. 5, for example, it is determined whether the data volumes of respective deleted data 521, 522, and 523 exceed a threshold data volume Sn if the storage spaces corresponding to the data volumes of deleted data 521, 522, and 523 have consecutive physical addresses.

The first sub-data volume in the data volume of the failed data in sub-storage space 401 may be Sc=S1+S3 if it is determined that the data volumes of deleted data 521 and 523 exceed the threshold data volume Sn. Assuming that the total size of sub-storage space 401 is S, it may be determined that a ratio (Rcd) of the first data volume in the data volume of the failed data in sub-storage space 401 to the total size is Sc/S. In this way, a corresponding Rcd value in sub-storage space 402 may also be determined.

Sub-storage space 401 is determined as the target sub-storage space to be released if it is determined that the ratio of the first data volume in the data volume of the failed data in sub-storage space 401 to the total size of sub-storage space 401, i.e. the first Rcd value, exceeds the ratio of the second data volume in the data volume of the failed data in sub-storage space 402 to the total size of sub-storage space 402, i.e. the second Rcd value.

In one embodiment, the target sub-storage space may be further selected through data failure trends in sub-storage space 401 and sub-storage space 402 within a certain time interval if it is determined that the first Rcd value and the second Rcd value are equal. This trend may also be referred to as temperature hereinafter. The temperature of the sub-storage space is higher if more data is to be deleted (failed) in the latest predetermined garbage recycling.

Temperature T of the sub-storage space may be determined by the following formula:

$$T = \text{Int}\left(\frac{Sgm}{S} \times N\right) \quad (1)$$

where Sgm is the data volume of data that will be deleted in the latest predetermined garbage recycling, S is the total size of the sub-storage space, and N is a temperature coefficient.

In one embodiment, sub-storage space 401 is determined as the target sub-storage space to be released if it is determined that temperature T1 of sub-storage space 401 is higher than temperature T2 of sub-storage space 402.

In some embodiments, it can be determined whether the current free storage space of the SSD disk can meet the data volume requirement of the target data to be written after the selected target sub-storage space is released, and another sub-storage space to be released can be further determined if the current free storage space cannot meet the data volume requirement of the target data to be written.

As such, since the operation of moving valid data in an SSD block to a new SSD block is reduced, the WAF of a storage system, especially an SSD, can be effectively reduced, and the service life of the SSD can be prolonged.

Figure 6:
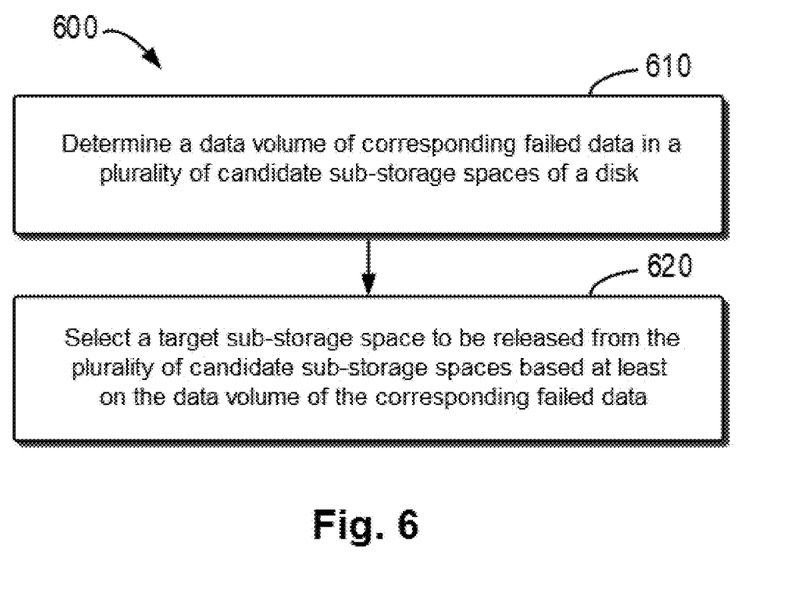
FIG. 6 illustrates a flowchart of a method for storage management according to the embodiments of the present disclosure.

FIG. 6 illustrates a flowchart of method 600 for storage management according to some embodiments of the present disclosure. Method 600 may be implemented in system 100 shown in FIG. 1. Method 600 may be, for example, executed by computing device 101 in system 100 shown in FIG. 1. Method 600 may be described with reference to FIG. 1.

At block 610, computing device 101 determines the data volume of corresponding failed data in a plurality of candidate sub-storage spaces of a disk, the plurality of candidate sub-storage spaces being formed by dividing the original storage space of the disk and having consecutive physical addresses, and the size of one candidate sub-storage space being associated with the size of the storage space of at least one block that constitutes the disk.

At block 620, computing device 101 selects a target sub-storage space to be released from the plurality of candidate sub-storage spaces based at least on the data volume of the corresponding failed data.

In some embodiments, computing device 101 may determine a first ratio of a first data volume of failed data in a first candidate sub-storage space in the plurality of candidate sub-storage spaces to the size of the first candidate sub-storage space. Computing device 101 selects the first candidate sub-storage space as the target sub-storage space if it determines that the first ratio exceeds a threshold ratio.

In some embodiments, computing device 101 may determine a first ratio of a first data volume of failed data in a first candidate sub-storage space in the plurality of candidate sub-storage spaces to the size of the first candidate sub-storage space and a second ratio of a second data volume of failed data in a second candidate sub-storage space in the plurality of candidate sub-storage spaces to the size of the second candidate sub-storage space. Computing device 101 may determine a third ratio of a first sub-data volume in the first data volume to the size of the first candidate sub-storage space and a fourth ratio of a second sub-data volume in the second data volume to the size of the second candidate sub-storage space if computing device 101 determines that the first ratio and the second ratio both exceed a threshold ratio, the first sub-data volume corresponding to one group of storage spaces that have consecutive physical addresses in the first candidate sub-storage space, and the second sub-data volume corresponding to another group of storage spaces that have consecutive physical addresses in the second candidate sub-storage space. Computing device 101 selects the first candidate sub-storage space as the target sub-storage space if it determines that the third ratio is greater than the fourth ratio.

In some embodiments, computing device 101 determines a third data volume of failed data in the first candidate sub-storage space and a fourth data volume of failed data in the second candidate sub-storage space within a predetermined time interval if it determines that the third ratio is equal to the fourth ratio. Computing device 101 selects the first candidate sub-storage space as the target sub-storage space if it determines that the third data volume exceeds the fourth data volume.

In some embodiments, computing device 101 may determine a first ratio of a first data volume of failed data in a first candidate sub-storage space in the plurality of candidate sub-storage spaces to the size of the first candidate sub-storage space and a second ratio of a second data volume of failed data in a second candidate sub-storage space in the plurality of candidate sub-storage spaces to the size of the second candidate sub-storage space. Computing device 101 may determine a third data volume of failed data in the first candidate sub-storage space and a fourth data volume of failed data in the second candidate sub-storage space within a predetermined time interval if computing device 101 determines that the first ratio and the second ratio both exceed a threshold ratio. Computing device 101 selects the first candidate sub-storage space as the target sub-storage space if it determines that the third data volume exceeds the fourth data volume.

In some embodiments, computing device 101 may determine whether the data volume of target data to be written to the disk exceeds the size of the free storage space of the disk. Computing device 101 may determine the data volume of the corresponding failed data if it determines that the data volume of the target data exceeds the size of the free storage space.

In some embodiments, computing device 101 may determine whether the size of the free storage space of the disk is less than a threshold space size. Computing device 101 determines the data volume of the corresponding failed data if it determines that the free storage space is less than the threshold space size.

In some embodiments, computing device 101 determines whether the free storage space in the released target sub-storage space exceeds the data volume of the target data to be written to the disk. Computing device 101 writes the target data to the released target sub-storage space if it determines that the free storage space in the released target sub-storage space exceeds the data volume of the target data to be written to the disk.

In some embodiments, computing device 101 selects another target sub-storage space to be released from the plurality of candidate sub-storage spaces other than the target sub-storage space if it determines that the free storage space in the released target sub-storage space is less than the data volume of the target data to be written to the disk.

Figure 7:
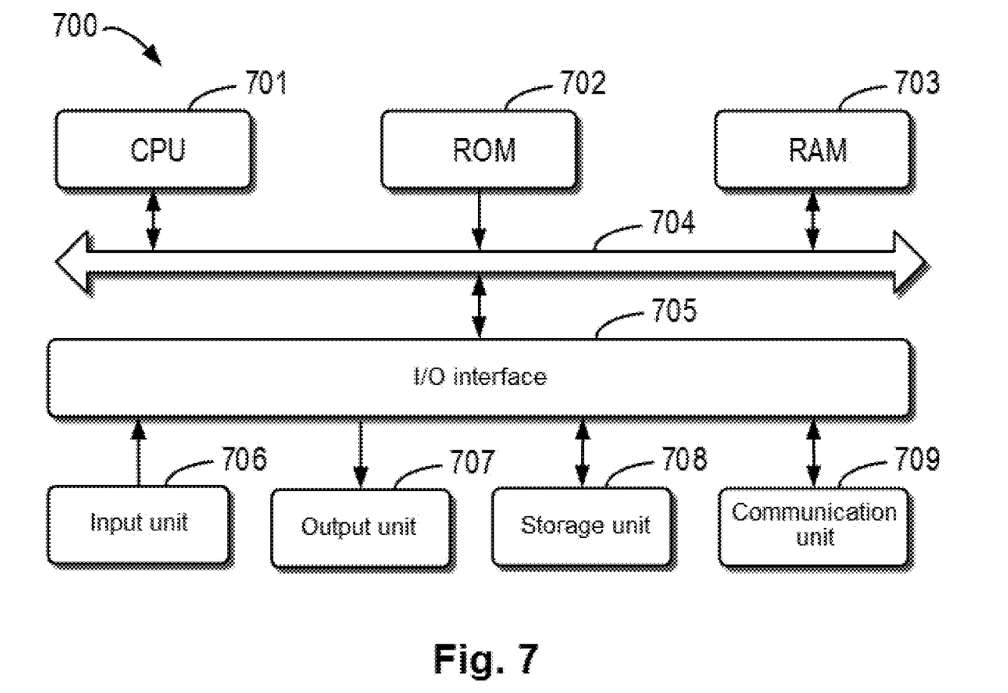
FIG. 7 is a schematic block diagram of a device that can be configured to implement the embodiments of the present disclosure.

FIG. 7 schematically shows a block diagram of device 700 that can be configured to implement an embodiment of the present disclosure. Device 700 may be implemented as or included in storage system 100 of FIG. 1 or computing device 101 of storage system 100.

As shown in FIG. 7, device 700 includes central processing unit (CPU) 701 which may execute various appropriate actions and processing in accordance with computer program instructions stored in read-only memory (ROM) 702 or computer program instructions loaded onto random access memory (RAM) 703 from storage unit 708. Various programs and data required for operations of device 700 may also be stored in RAM 703. CPU 701, ROM 702, and RAM 703 are connected to one another through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices over a computer network such as the Internet and/or various telecommunication networks.

The various processes and processing described above, such as process 600, may be performed by processing unit 701. For example, in some embodiments, process 600 may be implemented as a computer software program that is tangibly included in a machine-readable medium, for example, storage unit 708. In some embodiments, part or all of the computer program may be loaded and/or installed onto device 700 via ROM 702 and/or communication unit 709. When the computer program is loaded onto RAM 703 and executed by CPU 701, one or more steps of process 600 described above may be performed.

As used herein, the term "include" and similar terms thereof should be understood as open-ended inclusion, that is, "including but not limited to." The term "based on" should be construed as "at least partially based on." The term "an embodiment" or "the embodiment" should be construed as "at least one embodiment." The terms "first," "second," and the like may refer to different or identical objects. Other explicit and implicit definitions may be further included herein.

As used herein, the term "determining" covers various actions. For example, the "determining" may include operating, computing, processing, outputting, investigating, finding (e.g., finding in a table, a database or another data structure), ascertaining, and the like. In addition, the "determining" may include receiving (e.g., receiving information), accessing (e.g., accessing data in a memory), and the like. In addition, the "determining" may include analyzing, selecting, choosing, establishing, and the like.

It should be noted that the embodiments of the present disclosure may be implemented by hardware, software, or a combination of software and hardware. The hardware portion may be implemented using a dedicated logic. The software portion may be stored in a memory and executed by a suitable instruction execution system, such as a microprocessor or dedicated designed hardware. Those skilled in the art may understand that the above device and method may be implemented using a computer executable instruction and/or by being contained in a processor control code. For example, such a code is provided in a programmable memory or a data carrier such as an optical or electronic signal carrier.

Further, while the operations of the method in the present disclosure are described in a particular sequence in the accompanying drawings, this does not require or imply that these operations must be executed in the particular sequence, or all shown operations must be executed to achieve the desired result. On the contrary, the execution sequence of the steps depicted in the flow charts may be changed. Additionally or alternatively, some steps may be omitted, a plurality of steps may be combined into one step for execution, and/or one step may be decomposed into a plurality of steps for execution. It should be further noted that the features and functions of two or more apparatuses according to the present disclosure may be embodied in one apparatus. Conversely, the features and functions of one apparatus described above may be further divided for embodiment by a plurality of apparatuses.

While the present disclosure is described with reference to some specific embodiments, it should be understood that the present disclosure is not limited to the disclosed specific embodiments. The present disclosure is intended to cover various modifications and equivalent arrangements included in the spirit and scope of the appended claims.

The invention claimed is:

1. A method for storage management, comprising:
   determining a data volume of corresponding failed data in a plurality of candidate sub-storage spaces of a disk, the plurality of candidate sub-storage spaces being formed by dividing an original storage space of the disk and having consecutive physical addresses, and a size of one candidate sub-storage space being associated with a size of a storage space of at least one block that constitutes the disk; and
   selecting a target sub-storage space to be released from the plurality of candidate sub-storage spaces based at least on the data volume of the corresponding failed data, wherein selecting the target sub-storage space to be released comprises:
   determining a first ratio of a first data volume of failed data in a first candidate sub-storage space in the plurality of candidate sub-storage spaces to the size of the first candidate sub-storage space and a second ratio of a second data volume of failed data in a second candidate sub-storage space in the plurality of candidate sub-storage spaces to the size of the second candidate sub-storage space.

2. The method according to claim 1, wherein selecting a target sub-storage space to be released further comprises:
   selecting the first candidate sub-storage space as the target sub-storage space if the first ratio is determined to exceed a threshold ratio.

3. The method according to claim 1, wherein selecting a target sub-storage space to be released further comprises:
   determining a third ratio of a first sub-data volume in the first data volume to the size of the first candidate sub-storage space and a fourth ratio of a second sub-data volume in the second data volume to the size of the second candidate sub-storage space if the first ratio and the second ratio both exceed a threshold ratio, the first sub-data volume corresponding to one group of storage spaces that have consecutive physical addresses in the first candidate sub-storage space, and the second sub-data volume corresponding to another group of storage spaces that have consecutive physical addresses in the second candidate sub-storage space; and
   selecting the first candidate sub-storage space as the target sub-storage space if the third ratio is determined to be greater than the fourth ratio.

4. The method according to claim 3, further comprising:
   determining a third data volume of failed data in the first candidate sub-storage space and a fourth data volume of failed data in the second candidate sub-storage space within a predetermined time interval if the third ratio is determined to be equal to the fourth ratio; and
   selecting the first candidate sub-storage space as the target sub-storage space if the third data volume is determined to exceed the fourth data volume.

5. The method according to claim 1, wherein selecting a target sub-storage space to be released further comprises:
   determining a third data volume of failed data in the first candidate sub-storage space and a fourth data volume of failed data in the second candidate sub-storage space within a predetermined time interval if the first ratio and the second ratio both exceed a threshold ratio; and selecting the first candidate sub-storage space as the target sub-storage space if the third data volume is determined to exceed the fourth data volume.

6. The method according to claim 1, wherein determining the data volume of corresponding failed data comprises:
determining whether the data volume of target data to be written to the disk exceeds the size of the free storage space of the disk; and
determining the data volume of the corresponding failed data if the data volume of the target data is determined to exceed the size of the free storage space.

7. The method according to claim 1, wherein determining the data volume of corresponding failed data comprises:
determining whether the size of the free storage space of the disk is less than a threshold space size; and
determining the data volume of the corresponding failed data if the free storage space is less than the threshold space size.

8. The method according to claim 1, further comprising:
determining whether the free storage space in the released target sub-storage space exceeds the data volume of target data to be written to the disk; and
writing the target data to the released target sub-storage space if the free storage space in the released target sub-storage space exceeds the data volume of the target data to be written to the disk.

9. The method according to claim 8, further comprising:
selecting another target sub-storage space to be released from the plurality of candidate sub-storage spaces other than the target sub-storage space if the free storage space in the released target sub-storage space is determined to be less than the data volume of the target data to be written to the disk.

10. An electronic device, comprising:
a processor; and
a memory coupled to the processor and storing instructions that need to be executed and, when executed by the processor, cause the electronic device to perform actions comprising:
determining a data volume of corresponding failed data in a plurality of candidate sub-storage spaces of a disk, the plurality of candidate sub-storage spaces being formed by dividing an original storage space of the disk and having consecutive physical addresses, and a size of one candidate sub-storage space being associated with a size of a storage space of at least one block that constitutes the disk; and
selecting a target sub-storage space to be released from the plurality of candidate sub-storage spaces based at least on the data volume of the corresponding failed data, wherein selecting the target sub-storage space to be released comprises:
determining a first ratio of a first data volume of failed data in a first candidate sub-storage space in the plurality of candidate sub-storage spaces to the size of the first candidate sub-storage space and a second ratio of a second data volume of failed data in a second candidate sub-storage space in the plurality of candidate sub-storage spaces to the size of the second candidate sub-storage space.

11. The device according to claim 10, wherein selecting a target sub-storage space to be released further comprises:

selecting the first candidate sub-storage space as the target sub-storage space if the first ratio is determined to exceed a threshold ratio.

12. The device according to claim 10, wherein selecting a target sub-storage space to be released further comprises:
determining a third ratio of a first sub-data volume in the first data volume to the size of the first candidate sub-storage space and a fourth ratio of a second sub-data volume in the second data volume to the size of the second candidate sub-storage space if the first ratio and the second ratio both exceed a threshold ratio and the first ratio is equal to the second ratio, the first sub-data volume corresponding to one group of storage spaces that have consecutive physical addresses in the first candidate sub-storage space, and the second sub-data volume corresponding to another group of storage spaces that have consecutive physical addresses in the second candidate sub-storage space; and
selecting the first candidate sub-storage space as the target sub-storage space if the third ratio is determined to be greater than the fourth ratio.

13. The device according to claim 12, wherein the actions further comprise:
determining a third data volume of failed data in the first candidate sub-storage space and a fourth data volume of failed data in the second candidate sub-storage space within a predetermined time interval if the third ratio is determined to be equal to the fourth ratio; and
selecting the first candidate sub-storage space as the target sub-storage space if the third data volume is determined to exceed the fourth data volume.

14. The device according to claim 10, wherein selecting a target sub-storage space to be released further comprises:
determining a third data volume of failed data in the first candidate sub-storage space and a fourth data volume of failed data in the second candidate sub-storage space within a predetermined time interval if the first ratio and the second ratio both exceed a threshold ratio; and
selecting the first candidate sub-storage space as the target sub-storage space if the third data volume is determined to exceed the fourth data volume.

15. The device according to claim 10, wherein determining the data volume of corresponding failed data comprises:
determining whether the data volume of target data to be written to the disk exceeds the size of the free storage space of the disk; and
determining the data volume of the corresponding failed data if the data volume of the target data is determined to exceed the size of the free storage space.

16. The device according to claim 10, wherein determining the data volume of corresponding failed data comprises:
determining whether the size of the free storage space of the disk is less than a threshold space size; and
determining the data volume of the corresponding failed data if the free storage space is less than the threshold space size.

17. The device according to claim 10, wherein the actions further comprise:
determining whether the free storage space in the released target sub-storage space exceeds the data volume of target data to be written to the disk; and
writing the target data to the released target sub-storage space if the free storage space in the released target sub-storage space exceeds the data volume of the target data to be written to the disk.

18. The device according to claim 17, wherein the actions further comprise:

selecting another target sub-storage space to be released from the plurality of candidate sub-storage spaces other than the target sub-storage space if the free storage space in the released target sub-storage space is determined to be less than the data volume of the target data to be written to the disk.

19. A computer program product tangibly stored on a non-transitory computer-readable medium and comprising machine-executable instructions, wherein the machine-executable instructions, when executed, cause a machine to perform actions, the actions comprising:

determining a data volume of corresponding failed data in a plurality of candidate sub-storage spaces of a disk, the plurality of candidate sub-storage spaces being formed by dividing an original storage space of the disk and having consecutive physical addresses, and a size of one candidate sub-storage space being associated with a size of a storage space of at least one block that constitutes the disk; and selecting a target sub-storage space to be released from the plurality of candidate sub-storage spaces based at least on the data volume of the corresponding failed data, wherein selecting the target sub-storage space to be released comprises:

determining a first ratio of a first data volume of failed data in a first candidate sub-storage space in the plurality of candidate sub-storage spaces to the size of the first candidate sub-storage space and a second ratio of a second data volume of failed data in a second candidate sub-storage space in the plurality of candidate sub-storage spaces to the size of the second candidate sub-storage space.

20. The computer program product according to claim 19, wherein selecting a target sub-storage space to be released further comprises:

selecting the first candidate sub-storage space as the target sub-storage space if the first ratio is determined to exceed a threshold ratio.

\* \* \* \* \*